United States Patent [19]

Houser, Jr.

[11] Patent Number: 4,712,055

[45] Date of Patent: Dec. 8, 1987

[54] BATTERY CHARGER CIRCUIT

[75] Inventor: John Houser, Jr., Pickens, S.C.

[73] Assignee: The Singer Company, Stamford, Conn.

[21] Appl. No.: 32,674

[22] Filed: Apr. 1, 1987

[51] Int. Cl.$^4$ .............................................. H02J 7/10
[52] U.S. Cl. .................................. 320/35; 320/DIG. 2
[58] Field of Search ....................... 320/35, 36, 22–24, 320/DIG. 2, 57, 59

[56] References Cited

U.S. PATENT DOCUMENTS

| | | | |
|---|---|---|---|
| 4,240,022 | 12/1980 | Kilinskis et al. ...................... | 320/23 |
| 4,328,457 | 5/1982 | Higuchi ................................. | 320/36 |
| 4,528,492 | 7/1985 | Inaniwa et al. ....................... | 320/36 |
| 4,623,832 | 11/1986 | Fujiwara ........................... | 320/36 X |

Primary Examiner—R. J. Hickey
Attorney, Agent, or Firm—David L. Davis

[57] ABSTRACT

A latching arrangement is provided in a high speed battery charging circuit. The latching arrangement includes a momentary switch for momentarily changing a voltage level on a gate controlling capacitor for a gate controlled high current path and an inversion circuit between the capacitor and the gate, thus permitting a voltage provided by a thermostatically controlled switch to be applied to the capacitor for controlling the gate. The thermostatically controlled switch senses battery cell temperature and permits fast charging for temperatures below a threshold. The momentary switch is momentarily activated to initiate the fast charging operation. Upon sensing a temperature rise, the thermostatically controlled switch terminates fast charging and initiates trickle charging. When the battery cell cools and the thermostatically controlled switch again closes, the latching arrangement prevents resumption of a fast charge operation.

20 Claims, 5 Drawing Figures

BATTERY CHARGER CIRCUIT

TECHNICAL FIELD

This invention relates to battery chargers, and more particularly to such devices for providing rapid recharging of nickel-cadmium batteries and including controls therein to avoid battery destruction due to overcharging by changing the device operating mode from a rapid charge mode to a trickle charge mode upon detection of a fully charged condition.

BACKGROUND ART

The use of rechargeable nickel-cadmium (nicad) batteries for consumer products is well established. Such rechargeable batteries are frequently used in portable power tools, such as cordless power drills, saws and the like. Additionally, rechargeable batteries also find application in shavers, photographic equipment and other products.

Unlike disposable batteries, however, the nicad batteries require recharging upon dissipation of the electrical energy stored therein. The recharging period of the nicad batteries, if too long, may thus diminish the effectiveness of the power tools which incorporate the batteries. There have thus been prior art attempts to speed up the charge rate in order more quickly to restore the batteries to full capacity.

The normal recommended continuous charge rate for nicad batteries is C/10 where C is the battery capacity in ampere-hours. The normal charge rate thus results in a time of 12 hours or more to recharge a battery pack. Such a time requirement is excessive, however. If the batteries powering a product are discharged prior to completion of the desired task, it is necessary for the operator either to wait for a recharge or to replace the battery pack with a fully charged replacement pack. The first approach, as above noted, is typically highly time consumptive while the second is expensive.

Accordingly, the prior art has developed several approaches to reducing the recharge time for rechargeable batteries, including various techniques to avoid overcharging the units.

In one approach to the problem, battery manufacturers have conducted research into battery characteristics under charge and have developed special cells. Thus, some newer cells are characterized by a charge rate of C/3. These cells are capable of withstanding the higher charge rate indefinitely. The time required for fully charging such cells has thus been reduced to approximately 4 hours. However, even this amount of time may be too long for some applications.

Research by the battery manufacturers has also determined that properly designed cells may be charged at a rate of C/1, so that a cell may be recharged in approximately 1.2 hours, for the popular sub C (Cs) cell size. However, this approach can only be used if the high charge rate is terminated before the cells enter a destructive overcharge condition. For such cells, a maintenance, or "trickle" charge rate of C/10 is provided after the C/1 charge rate is complete. The trickle charge rate effectively "tops off" the battery charge and maintains the cell at full capacity until used.

It is thus necessary accurately to determine the particular point at which the permissible charge rate drops from the fast, C/1, rate to the trickle, C/10, rate in order to use the newly developed cells. Moreover, it is necessary to develop a control device which can accurately detect the changeover point and vary the charge rate accordingly.

Research into various cell characteristics which can be used for detecting the proper termination point for the C/1 charge rate has centered on voltage profiles, temperature changes, and internal pressure changes responsive to the charged state of the cell. Some prior art attempts have been directed to the use of internal cell pressure as the charging criterion. However, a special cell construction is required for sensing the internal pressure of the cell, involving access to the interior of the cell. The pressure sensing approach has thus not been widespread and is generally considered expensive.

Other cell characteristics which have been considered as the criteria for determining the permissible charging state of the cell have included voltage and temperature.

Sensing the voltage alone, however, has generally not been found useful, since the voltage change from a discharged state to a fully charged state of the cell is small and is hard to detect accurately. More specifically, the change in voltage is typically of the same order of magnitude as the variation in voltage which may be found between cells of a battery. Such a variation, when within established tolerance levels, is small relative to the total cell voltage. Prior charging circuit designs have thus combined voltage sensing with temperature sensing, usually by placing a thermistor into intimate contact with the battery pack. However, the prior circuits, while generally effective, were complicated and expensive.

More recent improvements in cell design have made it possible to sense only the cell temperature as the criterion for terminating a C/1 charge rate. It is considered acceptable in the battery art to protect the cells from temperatures in excess of 45° C. Thus, in known circuits thermostatically controlled switches are provided in intimate contact with the batteries. The thermostat is designed to open the associated switch at a temperature of 45° C.

A simple approach is used in one temperature sensitive arrangement of the prior art. Therein, the thermostatically controlled switch itself is used to break the fast charge current directly. A limiting resistor is provided in parallel with, and in close proximity to, the thermostat for supplying the C/10 maintenance charge current. In such a circuit, it is necessary to prevent further rapid charging of the battery cell once the trickle charge state has been entered.

More particularly, once the thermostatic switch has opened the rapid charge circuit the battery cell will cool, tending to reclose the thermostat and to reinitiate the process. Thus, it is necessary to latch the thermostatically controlled switch to an open condition once the fully charged state has been reached. The above described prior art approach utilizes the maintenance charge current to heat the thermostat, thereby to keep the thermostatic switch open for so long as the maintenance charge is continued. More specifically, in this approach the maintenance charge current is used to heat the limiting resistor for the trickle charging current. The close proximity between the limiting resistor and the thermostat provides a heat transfer therebetween, causing a temperature increase at the thermostat and opening the switch controlled thereby.

Although the above concept is low in cost, such an approach requires continued heating of the thermostat by the C/10 limiting resistor. Since the thermostat is in intimate contact with the battery cells, however, the above described approach provides continued heating of the battery cells during the maintenance charging state. Such heating can shorten battery life. Moreover, the above described circuit leads to reduced reliability of the thermostatic switch, since the thermostat itself is required to break the large rapid-charge current at each termination of the rapid charge condition.

In another example of this approach, wherein the thermostat is required to break large currents in the rapid-charge mode, a gate of an SCR is biased by a capacitor and the thermostatic switch is in series with the SCR. It is thus necessary to control precisely the voltage on the capacitor in order to assure proper biasing of the SCR gate. Reliability of this approach suffers still further because of possible variations in capacitor parameters, and because of the difficulty of providing a more precise point at which to turn on the SCR.

A more reliable concept has been to use the thermostat as a sensor only. In this approach, the thermostat is used to control associated electronics which, in turn, regulate the current. As with the previous approach, however, it is necessary to avoid overcharging the battery by a condition in which the fast charge rate is restarted once the batteries cool in the maintenance charge condition and the thermostat closes.

The major advantage of such an arrangement is that it is not necessary to heat the thermostat (hence the batteries) to latch the charger out of the fast charge mode while continuing a maintenance charge, since the charge rate is electronically controlled. Moreover, the thermostat is only required to switch a very low level sensing current rather than the full fast charge current.

Low cost circuits utilizing the above approach are sensitive to one or more variables, however, such as battery or electronic component tolerance or battery impedance, which affects the reliability of latching the circuit out of the fast charge mode. In one such circuit the collector-emitter junction of a transistor is used to clamp across a gate-cathode junction of a power SCR. Such an arrangement does not necessarily keep the SCR off and is subject to variations in junction voltages of the transistor. Under particular circumstances it is thus possible that the SCR, supplying a high rapid charge current, may not be fully turned off and may overcharge the battery. Other circuits, using integrated circuits, controlled tolerance electronic devices, or other special techniques have been used to increase the reliability of the above described approach. However, such circuits are more expensive and thus are less desirable.

There is thus a need in the prior art for an inexpensive circuit, providing reliable recharging of battery cells and including reliable, low cost, control circuitry to avoid overheating and overcharging the battery.

It is accordingly an object of the invention to overcome the difficulties of the prior art and to provide a battery charging apparatus for rapid charging and maintenance charging of a battery.

It is a more specific object to provide a low cost battery charging apparatus wherein a thermostatic switch detects an appropriate transition point for terminating rapid charging and for initiating maintenance, or trickle charging of a battery.

It is still another object to provide a low cost battery charging apparatus utilizing a thermostatic switch to switch a low level sensing current rather than the full charging current.

Yet another object of the invention is the provision of a dual mode battery charging apparatus wherein a thermostatic switch senses an increased temperature to transfer charging from a rapid mode to a trickle mode and wherein a voltage providing circuit is used to latch the apparatus to the trickle mode when the thermostatic switch returns to a low temperature status.

Still a more specific object of the invention is the provision of a voltage storage device for triggering a gate controlled SCR for rapidly charging a battery, including a circuit arrangement for changing the voltage level provided to the storage device in response to a temperature condition of the battery.

Yet a more particular object is an arrangement wherein an inverting structure is interposed between a voltage storage device and a gate controlled device triggered thereby, so that when a thermostatically controlled switch responds to a high temperature, fully charged, condition of a battery and increases the voltage of the storage device the reduced voltage of the inverting structure maintains the gate controlled device inactive even after the thermostatically controlled switch returns to a low temperature condition.

It is still a further object of the invention to provide a triggering device for a gate controlled device in a battery charging apparatus wherein a separate switch is required to be activated, in addition to activation of a thermostatically controlled switch, in order to cause a rapid charging operation and wherein reactivation of the thermostatically controlled switch, alone, will not reinitiate the rapid charging operation.

SUMMARY OF THE INVENTION

In accordance with these and other objects of the invention, there is provided an improved battery charging apparatus including a power source generating a charging voltage for the battery and a gate controlled charger for controllably providing a first, or high, charging current to the battery, wherein the gate controlled means is connected in a series connection between the power source means and the battery. A maintenance charger is included for providing a second, low, charging current to the battery, the maintenance charger connected between the power source and the battery. A voltage storing device stores a voltage to control the gate controlled charger. A voltage supply provides a first voltage level to the voltage storing device for controlling the gate controlled charger to a blocked state.

According to the invention, a switch is provided for altering the voltage stored in the voltage storing device to a second voltage level, lower than the first level, for controlling the gate controlled charger to a conducting state for charging the battery. A second switch is controlled by a temperature sensor, which detects temperature ranges corresponding to uncharged and charged states of the battery and assumes respective first and second states responsive thereto. Additionally, a latch is provided for latching the gate controlled charger to the blocked state in response to the second state of the temperature sensor and for maintaining the voltage on the voltage storing device at the first voltage level when the temperature sensor returns to the first state thereof after being in the second state. Thus, the latch prevents the gate controlled charger from providing the first charging current to the battery when the temperature sensor is in the first state thereof after the second state thereof.

The temperature sensor is operable in the first state for connecting the voltage supply to a separate voltage level for changing the voltage supplied to the voltage storing device, thus maintaining the second voltage level provided thereto after operation of the first switch, thereby controlling the gate controlled charger to the conducting state and providing rapid charging of the battery.

The temperature sensor is operable in the second state for disconnecting the voltage supply from the separate voltage level, thereby changing a voltage on the voltage storing device to a value approaching the first voltage level, thus controlling the gate controlled charger to the blocked state.

In accordance with one aspect of the invention, the latch includes the voltage supply for providing the first voltage level to the voltage storing device in response to the blocked state of the gate controlled charger. Additionally, the latch includes an inverter for inverting voltages in the voltage storing device and for applying the inverted voltages to a gate of the gate controlled charger.

Preferably, the voltage storing device includes a capacitor, the voltage supply includes a voltage divider connecting a voltage output by the power source to the capacitor, and the inverter includes a transistor connected between the capacitor and the gate of the gate controlled charger.

In accordance with another feature of the invention, the inverter includes a diode between an output of the transistor and the gate. The diode blocks voltages below a predetermined threshold from reaching the gate thereby maintaining the gate controlled charger in a blocked state, as well as for passing voltages above the threshold to the gate thereby maintaining the gate controlled charger in a conductive state.

Preferably, the voltage supply includes a voltage divider for connecting a portion of a voltage output by the power source to the voltage storing device. Additionally, the temperature sensor includes a thermostatically controlled switch in contact with at least one cell of the battery. The first state of the thermostatically controlled switch includes a closed state for cell temperatures below a predetermined temperature and the second state includes an opened state for cell temperatures above the predetermined temperature. Preferably, the thermostatically controlled switch is connected in series with the voltage divider for providing to the voltage storage means a smaller portion of the voltage output by the power source in the first, closed, state thereof and a larger portion of the voltage output by the power source in the second, opened, state thereof.

In accordance with another aspect of the invention, the voltage divider includes resistors having values selected for providing a voltage to the voltage storing device above the predetermined threshold level, thereby causing the gate controlled charger to remain in the blocked state when the thermostatically controlled switch is in its closed state.

Other objects, features and advantages of the present invention will become readily apparent to those skilled in the art from the following description wherein a preferred embodiment of the invention is shown and described, by way of illustration and not of limitation of one of the best modes suited to carry out the invention. As will be realized upon examination of the specification and from practice of the same, the present invention is capable of still other, different, embodiments and its several details are capable of various modifications, all without departing from the invention. Accordingly, the drawings and the descriptions provided herein are to be regarded as illustrative in nature and not as restrictive of the invention.

BEST MODE FOR CARRYING OUT THE INVENTION

Figure 1:
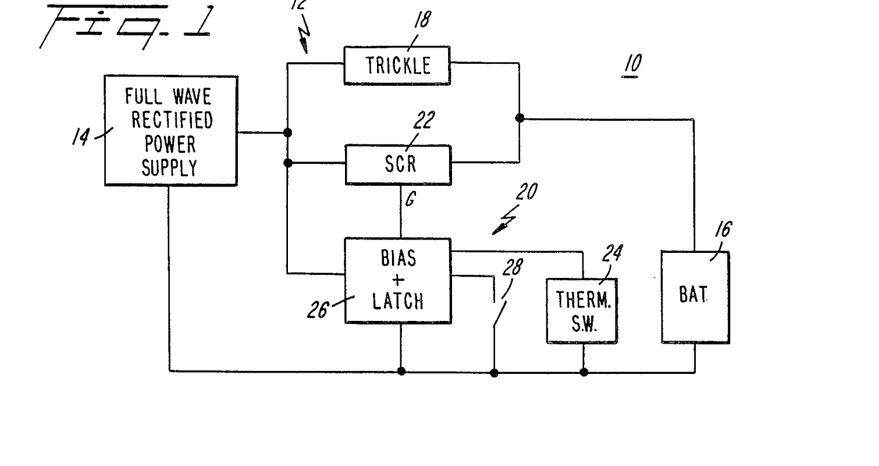
FIG. 1 shows a block diagram to facilitate understanding of the invention.

Reference is made to the block diagram of FIG. 1 which broadly illustrates a battery charging apparatus according to the above described features and advantages of the invention.

The inventive arrangement 10 is seen to provide a charging structure 12 between a power supply 14, typically comprised of a rectified output from an AC voltage source, and a rechargeable battery 16 being charged thereby. A trickle, or maintenance, charger 18 provides a maintenance current to the battery 16, determined at a rate such as C/10 or less where C is the amperehour capacity of battery 16. A separate, controlled, current path is provided between the power supply 14 and battery 16 for rapid charging, at higher current rates.

The separate current path includes a current limiting device, and more particularly a current blocking device under control of a current control portion 20 of the circuit. The current limiting device according to the preferred embodiment is comprised of a gate-controlled device such as a power SCR 22 which can be turned on each half cycle to supply quick charge (C/1) current to the battery. Thus, control portion 20 is used to control the voltage applied to a gate of SCR 22, thereby to control the charging current provided to battery 16.

Control portion 20 includes a sensing device 24 for sensing a condition indicative of a charged condition of battery 16 and a biasing and latching circuit 26 for biasing the gate of SCR 22 in response to an output from sensing device 24. As will be appreciated from the following description, circuit 26 further provides a latching condition, necessitated by the operating characteristics of the sensing device 24.

In accordance with the preferred embodiment of the invention, sensing device 24 includes a thermal sensor in thermal contact with at least one of the cells of battery 16. As will be understood by those skilled in the art, the cells of battery 16 experience a temperature rise due to inflow of charging current. Thus, when the cells have been charged to a predetermined level the temperature of the cell(s) reaches a predetermined threshold value, such as 45° C., for example. Accordingly, the thermal sensor 24 is selected to provide an indication of this predetermined temperature.

In accordance with the preferred embodiment of the invention, thermal sensor 24 includes a thermally activated switch which changes state upon temperature transition through the predetermined level. More particularly, as will be apparent from the circuit diagram of FIG. 2, the thermally activated switch opens when the sensed temperature increases above the threshold value and closes when the temperature drops below a second threshold, normally lower than the first.

In view of the characteristics of a typical battery cell being charged, however, once a charging current is discontinued the cell temperature will decrease. Thus, cell temperature is a more accurate indicator of quantity of charge stored in the battery cell by the charging current than of the absolute quantity of charge stored in the cell.

Accordingly, the condition of the temperature sensing switch cannot be relied on as an absolute indicator of battery charge condition. More specifically, the transition of the switch from the closed state thereof to the open state is a reliable indication of charge condition, but the reverse transition, which will occur once the charging current stops, is not an indication of a discharged state of the battery.

The present invention thus provides a latching feature for circuit 26 in order to latch operation of the biasing portion of the circuit to the levels attained during the open state of the thermal switch. Thus, after having been open due to a charged condition of the cell, when the thermal switch is closed due to cessation of charging current (rather than due to an uncharged state of the battery), the charging current through the SCR will not be reinitiated.

Towards that end, a manually operable switch 28 is provided, as a further condition for initiation of rapid charging current through the SCR. Preferably, switch 28 is a normally open, momentary switch.

Moreover, in order to reduce wear of the thermal switch, only a sensing current is switched by the thermal switch, rather than the entire charging current. Additionally, isolation is provided between the sensing current and voltage levels switched by thermal switch 24, on the one hand, and the gate of SCR 22, on the other. Such isolation is provided by an inverting circuit included in circuit 26.

Figure 2:
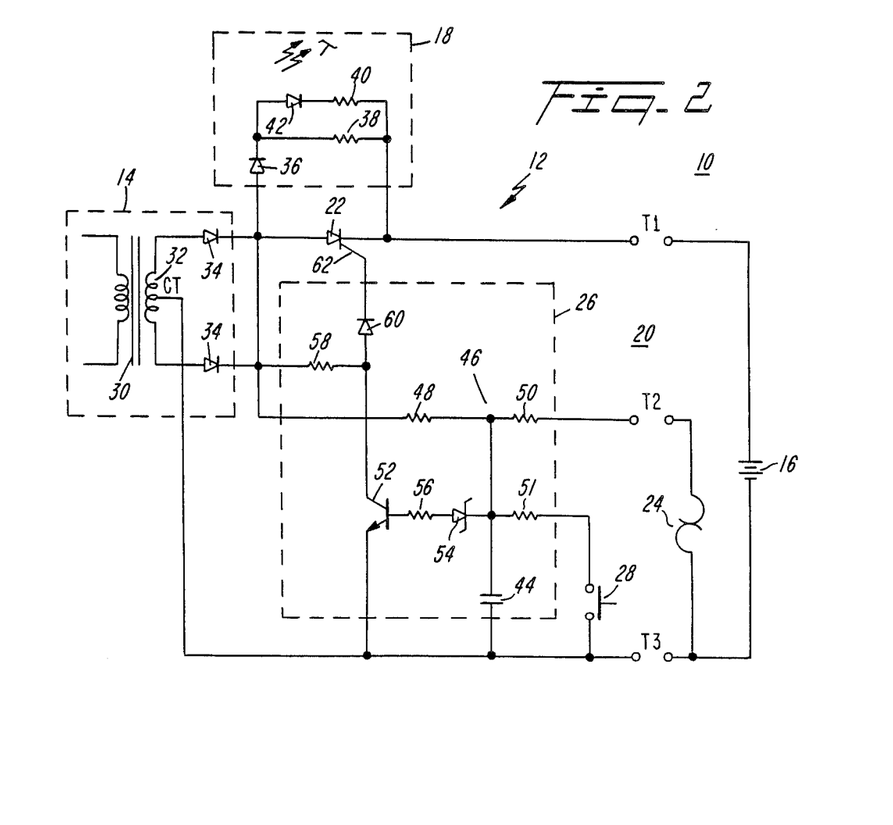
FIG. 2 provides a detailed circuit diagram for the inventive battery charging structure.

Referring now to the circuit of FIG. 2, the inventive circuit is shown in detail. Thus, the power supply 14 includes a transformer 30, having a center tapped secondary winding 32, and a pair of diodes 34 forming a full wave rectifier for the output voltage of transformer 30. The trickle charger 18 includes a protective diode 36 and a resistive path. Diode 36 is added to the trickle charge path to prevent discharging the battery if left in an unpowered charger. In the resistive path are provided a pair of resistors 38, 40, one resistor 38 providing part of a trickle current charge path and the other used together with an LED 42 to provide a charge indicator and the remainder of the trickle current charge path.

Since current will only flow through trickle charger 18, hence through LED 42, when SCR 22 is in an off condition and battery 16 is connected to power supply 14, LED 42 provides an indication of a "fully charged" state of the battery.

Thermal switch 24 of control portion 20 is in contact with the cell(s) of battery 16 and is thus typically packaged with the cells in a rechargeable battery pack included in a consumer appliance.

Bias and latching circuit 26 includes a capacitor 44, charged by a voltage divider 46 which supplied voltage thereto from power supply 14. Voltage divider 46 includes a pair of resistors 48 and 50 respectively connected to two different voltage levels, the power supply output and ground. Resistor 50, however, is connected to ground through the thermal switch 24, so that a higher voltage is supplied to capacitor 44 when switch 24 is open then when switch 24 is closed. Capacitor 44 is connected to ground through a series combination of switch 28 and a resistor 51.

The voltage on capacitor 44 is used to bias a transistor 52 to be on or off, through a biasing network including a zener diode 54 and a resistor 56. The collector of transistor 52 is connected to receive the rectified output voltage of power supply 14 via a collector resistor 58, and a diode 60 connects the collector voltage of transistor 52 to a gate 62 of SCR 22.

Operation of the inventive circuit is described as follows.

The charger is plugged into an AC line voltage prior to making connection to the battery pack. Rectifying diodes 34, connected to the secondary of transformer 30, provide a full wave rectified positive output voltage between the diode cathodes and the transformer center tap (CT). This output voltage is used to drive the bias and latching circuit as well as supply battery charge current when needed. Initially, capacitor 44 will charge to a voltage near the peak rectified voltage through resistor 48.

When the battery pack is attached to the charger via terminals T1 and T3, a trickle charge will flow through maintenance charger 18. Since the trickle charge current is supplied from the cathodes of diodes 34 through the parallel combination of resistor 38 and the series combination of resistor 40 and LED 42, through the battery 16 and returns through the transformer center tap, LED 42 indicates the low current charge rate.

As previously noted, the voltage of capacitor 44 is near the peak charging voltage prior to attachment of the battery pack. The voltage of capacitor 44 is a key element in operation of the circuit. The following disclosure thus describes how the capacitor voltage varies under different conditions and the effect of the voltage on circuit operation.

When battery 16 is attached to the charging circuit, but prior to initiating the fast charge operation, the voltage of capacitor 44 will drop somewhat since resistor 50 is connected to the negative voltage terminal (ground) via terminal T2 and the closed thermal switch 24. Thus, voltage divider 46 is formed by resistors 50 and 48, to provide a portion of the power supply voltage to capacitor 44. The circuit components of the inventive circuit are chosen so that, as long as SCR 22 is not conducting, the voltage of capacitor 44 will exceed the breakdown voltage of zener diode 54. Capacitor 44 is chosen to have a value sufficiently large so that the RC time constant formed thereby with its associated resistors is several times the duration of a half-cycle of line voltage. Thus, voltage loss on the capacitor between charging pulses is minimal.

When the voltage of capacitor 44 exceeds the breakdown voltage (vbr) of zener diode 54, a current flows to the baseemitter junction of transistor 52, initiating conduction therein. A current less than or equal to the current gain (hFE) of transistor 52 times the base-emitter current will flow from the collector of transistor 52 to the emitter thereof. The amplified current is supplied from the junction of diodes 34 to the collector of transistor 52 through resistor 58. The corresponding voltage drop across resistor 58 reduces the voltage at the anode of diode 60 to be well below the positive voltage of the battery, thus back biasing diode 60 and preventing current flow through the gate-cathode junction of SCR 22. Thus, the off state of SCR 22 is maintained.

A fast charging operation is initiated by closing momentary switch 28. During the short time (less than a second) required to hold switch 28 closed, resistor 51 quickly discharges the voltage of capacitor 44 to a value which is significantly less than the breakdown voltage of zener diode 54. Transistor 52 is thus turned off and diode 60 is no longer biased.

During the time in each half cycle when the voltage from diodes 34 exceeds the battery pack voltage, gate 62 of SCR 22 receives a sequence of voltage pulses from diodes 34 through resistor 58 and diode 60, which turn on the gate-cathode junction of SCR 22 and provide heavy charging current pulses to battery 16. Thus, SCR 22 is turned on for the rest of the half cycle while the power supply voltage exceeds the voltage of battery 16. The successive series of current pulses to the battery, during the on state of SCR 22 when the battery voltage is exceeded, constitutes the fast charge operation of the circuit.

The fast charge rate is sustained even after switch 28 is released to its normally open state, as follows.

The present invention relies on a voltage drop at the power supply output due to the internal resistance thereof. That is, when a heavy charging current is supplied for the fast charging operation, the output voltage of the power supply drops. Since the cells of the battery 16 have a low internal impedance, the voltage rise above the nominal battery voltage is small, as is the voltage drop across the anode and cathode of SCR 22 while conducting. Thus, a large voltage drop occurs in the transformer impedance and diodes 34 when compared with the voltage prior to initiation of the fast charge.

Because of the internal voltage drop of the power source, the voltage provided to capacitor 44 by voltage divider 46 is also substantially reduced and is less than the breakdown voltage of zener diode 54. Since zener diode 54 does not conduct, transistor 52 is off. That is, the transistor base-emitter junction voltage is minimal, thus making the inverted collector-emitter junction voltage a maximum. Under this condition, gate 62 of SCR 22 continues to be triggered on successive half cycles, as described above.

Fast charging continues until thermal switch 24 opens from the heat generated by battery 16 as it becomes fully charged. As previously noted, the accepted value for the changeover temperature is 45° C. When thermal switch 24 opens the voltage divider is disconnected by the open circuit at one terminal of resistor 50. Capacitor 44 charges toward the combined voltage of battery 16 and the corresponding voltage drop across the conducting SCR 22. This once again causes the voltage of capacitor 44 to exceed the breakdown voltage of zener diode 54, again causing transistor 52 to conduct. That is, the base-emitter junction voltage is maximum and the inverted collector-emitter junction voltage is minimum, thus back biasing diode 60 so that SCR 22 cannot be turned on.

In this condition, the output voltage of power supply 14 is again near maximum and the voltage across capacitor 44 is charged to near its peak value. As described previously LED 42 is on, indicating a change from fast to trickle charge.

Under these circumstances, where only a trickle charging current is supplied, the battery 16 will cool, thermal switch 24 will close and resistor 50 will be reconnected as part of the voltage divider 46. As was the case when the batteries were first connected, divider 46 will cause a drop in the voltage across capacitor 44. However, as previously described, the drop in voltage is not sufficient to take zener diode 54 out of conduction and to reinitiate fast charge.

The present circuit thus constantly charges capacitor 44 and provides an inverter between the capacitor and the gate of SCR 22. This arrangement permits a slight, momentary, discharge of the capacitor to activate the SCR and to initiate fast charge. Moreover, voltage drops due to the internal resistance of the power supply are used to maintain the fast charge operation after the switch 28 is reopened and to maintain the trickle charge operation after the switch 24 is reclosed.

Figure 3A:
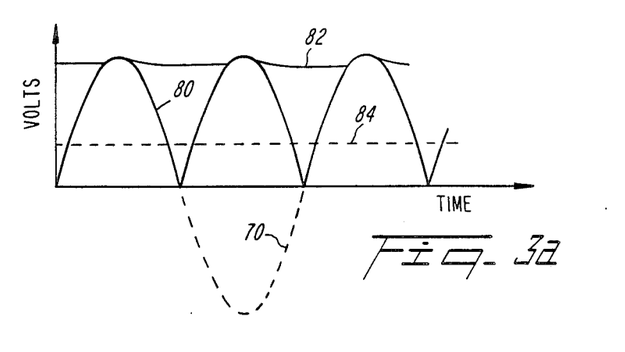
FIG. 3a-3c illustrate various waveforms useful in understanding operation of the invention.
Figure 3B:
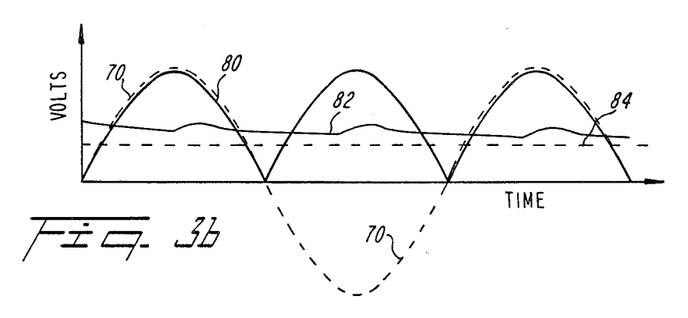
Figure 3C:
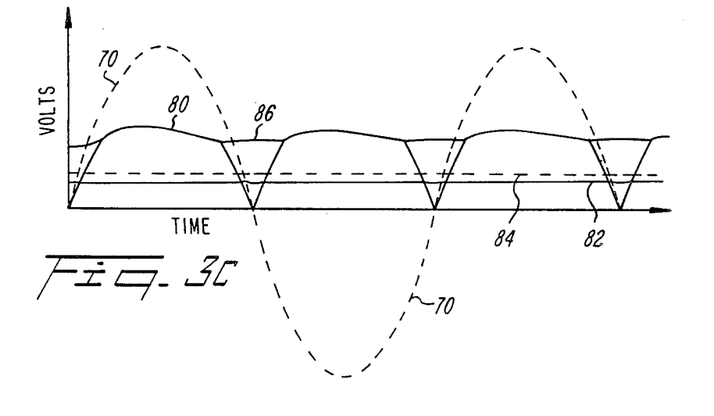

Operation of the invention is further clarified by reference to the waveforms of FIGS. 3a–3c. Therein, FIG. 3a illustrates the voltages in the circuit prior to connection of the battery to the charger. FIG. 3b shows the waveforms in a trickle charge state, while FIG. 3c shows the waveforms in the fast charge state.

In the waveforms, the dashed sinusoidal portions 70 represent the transformer voltage, while the solid sinusoidal portions 80 represent the output voltage of power supply 14 at the junction of diodes 34. The solid curve 82 in each waveform represents the voltage of capacitor 44, while the dashed curve 84 represents the breakdown voltage of zener diode 54. At FIG. 3c the waveform 86, which partially follows the sinusoid wave, represents the battery voltage. Thus, for those portions of the sinusoid wherein voltage waveform 80 exceeds the nominal battery voltage, waveform 86 follows the sinusoid. Where the waveform 80 is less than the battery voltage, SCR 22 is turned off and the battery voltage 86 remains substantially constant.

As can be seen from the waveforms, the battery voltage under heavy charge is considerably less than the peak rectified voltage from the transformer. This is desirable from a high rate charging standpoint since the charging current varies less with variations in primary line voltage. This effect also gives a wide working zone for the voltage of capacitor 44 to insure latching in the fast charge and trickle charge modes. Moreover, the circuit reduces the possibility that a fast charge cycle will be prematurely terminated because of the battery characteristics which make it nearly impossible (at a reasonable cost) to detect end of charge for fast charge termination, i.e., the small voltage difference between charged and uncharged cells and the low battery impedance which minimizes voltage rise under charge current.

The following circuit parameter values provide an illustrative example of the inventive circuit for an 8 cell fast charger. The parameter values were calculated using the transformer specification procedure outlined in "Nickel-Cadmium Battery Application Engineering Handbook", 2d Ed., General Electric, 1975, pp. 5-5, 5-6, 5-7:

The resulting 8 cell charger component values are listed below:

Transformer 30: 120 VAC input, 60 Hz, center tapped secondary, 29.3 VAC OPEN CIRCUIT output; secondary output 21 VAC at 1.4 amps.
SCR22: 4 amp, 50 PIV
Zener diode: 5.6V±5%, ½ W
Battery 16: 8-cell Nicad sub-c battery pack
Transistor 52: 2N3904 NPN high-gain signal transistor
Diodes 34: 1N5391; 1.5 amp, 50PIV
Diodes 36, 60: 1N4148; low leakage signal diodes
C44: 22uF±20%, 35 VDC
R40: 820 ohm±5%, ¼w
R38: 120 ohm±5%, 1/w R58: 20 Kohm±5%, ¼w
R48: 10 Kohm±5%, ¼W
R56: 82 Kohm±5%, ¼w
R50: 6.8 Kohm±5%, ¼w
R51: 220 ohm±5%, ¼w There has thus been described a preferred embodiment of the inventive battery charger which overcomes prior art difficulties and permits proper fast charging with accurate termination and trickle charging.

The foregoing description of the preferred embodiment of the invention has been presented for purposes of illustration and description and is not intended to be exhaustive or to limit the invention to the precise forms disclosed, since many modifications and variations are possible in light of the above teaching. The embodiment was chosen and described in order best to explain the principles of the invention and its practical application, thereby to enable others skilled in the art best to utilize the invention in various embodiments and with various modifications as are suited to the particular use contemplated therefor. It is intended that the scope of the invention be defined by the claims appended hereto, when interpreted in accordance with full breadth to which they are legally and equitably entitled.

I claim:

1. A battery charging apparatus for providing rapid charging and maintenance charging of a battery, comprising:

power source means generating a charging voltage for the battery;

gate controlled charging means for controllably providing a first, high, charging current to the battery, said gate controlled means connected in a series connection between the power source means and the battery;

maintenance charging means for providing a second, low, charging current to the battery, said second charging current having a lower magnitude than said first charging current, said maintenance charging means connected between the power source and the battery;

voltage storing means for storing a voltage to control said gate controlled charging means;

voltage supply means for providing a first voltage level to said voltage storing means for controlling said gate controlled charging means to a blocked state;

switch means for altering the voltage stored in said voltage storing means to a second voltage level for controlling said gate controlled charging means to a conducting state for charging the battery;

temperature sensing means for detecting temperature ranges corresponding to uncharged and charged states of the battery and for assuming respective first and second states responsive thereto, said temperature sensing means operable in said first state for connecting said voltage supply means to a separate voltage level for supplying a voltage to said voltage storing means for maintaining said second voltage level provided thereto after operation of said switch means thereby controlling said gate controlled charging means to said conducting state; and said temperature sensing means operable in said second state for disconnecting said voltage supply means from said separate voltage level and thereby to change a voltage on said voltage storing means to a value approaching said first voltage level for controlling said gate controlled charging means to said blocked state and for terminating a rapid charge operation of the charging apparatus; and latching means for latching said gate controlled charging means to said blocked state in response to said second state of said temperature sensing means and for maintaining the voltage on said voltage storing means at said first voltage level when said temperature sensing means returns to said first state after being in said second state, thereby preventing said gate controlled charging means from providing said first charging current to the battery when said temperature sensing means is in said first state thereof after said second state thereof, whereby said maintenance charging means provides said maintenance charging current to the battery when said temperature sensing means returns to said first state thereof from said second state.

2. A battery charging apparatus as recited in claim 1 wherein said latching means includes said voltage supply means for providing said first voltage level to said voltage storing means in response to said blocked stte of said gate controlled charging means.

3. A battery charging apparatus as recited in claim 2 wherein said latching means includes inverting means for inverting voltages in said voltage storing means and for applying the inverted voltages to a gate of said gate controlled charging means.

4. A battery charging apparatus as recited in claim 3 wherein said voltage storing means comprises capacitor means.

5. A battery charging apparatus as recited in claim 4 wherein said voltage supply means comprises voltage divider means connecting a voltage output by said power source means to said capacitor means, and said inverting means comprises transistor means connected between said capacitor means and said gate of said gate controlled charging means.

6. A battery charging apparatus as recited in claim 5 wherein said inverting means further comprises diode means between an output of said transistor means and said gate, said diode means operable for blocking voltages below a predetermined threshold from reaching said gate thereby maintaining said gate controlled charging means in a blocked state and for passing voltages above said threshold to said gate thereby maintaining said gate controlled charging means in a conductive state.

7. A battery charging apparatus as recited in claim 2 wherein said voltage supply means comprises voltage divider means for connecting a portion of a voltage output by said power source means to said voltage storing means.

8. A battery charging apparatus as recited in claim 7 wherein said temperature sensing means comprises thermostatically controlled switch means in theremal contact with at least one cell of the battery, said first state of said thermostatically controlled switch means comprising a closed state for cell temperatures below a predetermined temperature and said second state of said thermostatically controlled switch means comprising an opened state for cell temperatures above said predetermined temperature, said thermostatically controlled switch means connected in series with said voltage divider means for connecting one terminal of said voltage divider means to said separate voltage level and for providing to said voltage storage means a smaller portion of said voltage output by said power source means in said first, closed, state thereof and a larger portion of said voltage output by said power source means in said second, opened, state thereof.

9. A battery charging apparatus as recited in claim 8 wherein said latching means includes inverting means for inverting voltages in said voltage storing means and for applying the inverted voltages to a gate of said gate controlled charging means, said inverting means comprising transistor means connected between said voltage storing means and said gate of said gate controlled charging means and voltage level determining means for transmitting voltages from said voltage storing means to said inverting means and therefrom to said gate controlled charging means for causing said gate controlled charging means to operate in said blocked state thereof when said voltages exceed apredetermined threshold level, whereby said thermostatically controlled switch means causes said gate controlled charging means to operate in said blocked state when said thermostatically controlled switch means is opened due to cell temperatures above said predetermined temperature.

10. A battery charging apparatus as recited in claim 9 wherein said voltage divider means comprises resistance means having values selected for providing a voltage to said voltage storing means above said predetermined threshold level, thereby causing said gate controlled charging means to remain in said blocked state when said thermostatically controlled switch means is in its closed state.

11. In a battery charging apparatus for providing rapid charging and maintenance charging of a battery including: a power supply generating a charging voltage for the battery; gate controlled charging means for controllably providing a first, high, charging current to the battery; trickle charging means for providing a second, low, trickle charging current to the battery, the second charging current having a lower magnitude than the first charging current; and voltage storing means for storing a voltage to control the gate controlled charging means, the improvement comprising:

voltage supply means for providing a first voltage level to the voltage storing means for controlling the gate controlled charging means to a blocked state;

switch means for altering the voltage stored in the voltage storing means to a second voltage level for controlling the gate controlled charging means to a conducting state for charging the battery;

temperature sensing means for detecting temperature ranges corresponding to uncharged and charged states of the battery and for assuming respective first and second state responsive thereto, said temperature sensing means operable in said first state for connecting said voltage supply means to a separate voltage level for supplying a voltage to the voltage storing means for maintaining said second voltage level provided thereto after operation of said switch means thereby controlling the gate controlled charging means to said conducting state; and said temperature sensing means operable in said second state for disconnecting said voltage supply means from the separate voltage level and thereby to change a voltage on the voltage storing means to a value approching said first voltage level for controlling the gate controlled charging means to said blocked state and for terminating a rapid charge operation of the charging apparatus; and latching means for latching the gate controlled charging means to said blocked state in response to said second state of said temperature sensing means and for maintaining the voltage on the voltage storing means at said first voltage level when said temperature sensing means returns to said first state after being in said second state, thereby preventing the gate controlled charging means from providing said first charging current to the battery when said temperature sensing means is in said first state thereof after said second state thereof, whereby the trickle charging means provides the trickle charging current to the battery when said temperature sensing means returns to said first state thereof from said second state.

12. An improved battery charging apparatus as recited in claim 11 wherein said latching means includes said voltage supply means for providing said first voltage level to the voltage storing means in response to said blocked state of the gate controlled charging means.

13. An improved battery charging apparatus as recited in claim 12 wherein said latching means includes inverting means for inverting voltages in the voltage storing means and for applying the inverted voltages to a gate of the gate controlled charging means.

14. An improved battery charging apparatus as recited in claim 13 wherein the voltage storing means comprises capacitor means.

15. An improved battery charging apparatus as recited in claim 14 wherein said voltage supply means comprises voltage divider means connecting a voltage output by the power supply to said capacitor means, and said inverting means comprises transistor means connected between said capacitor means and the gate of the gate controlled charging means.

16. An improved battery charging apparatus as recited in claim 15 wherein said inverting means further comprises diode means between an output of said transistor means and the gate, said diode means operable for blocking voltages below a predetermined threshold from reaching the gate thereby maintaining the gate controlled charging means in a blocked state and for passing voltages above said threshold to the gate thereby maintaining the gate controlled charging means in a conductive state.

17. An improved battery charging apparatus as recited in claim 12 wherein said voltage supply means comprises voltage divider means for connecting a portion of a voltage output by the power supply to the voltage storing means.

18. An improved battery charging apparatus as recited in claim 17 wherein said temperature sensing means comprises thermostatically controlled switch means in thermal contact with at least one cell of the battery, said first state of said thermostatically controlled switch means comprising a closed state for cell temperatures below a predetermined temperature and said second state of said thermostatically controlled switch means comprising an opened state for cell temperatures above said predetermined temperature, said thermostatically controlled switch means connected in series with said voltage divider means for connecting one terminal of said voltage divider means to said separate voltage level and for providing to the voltage storage means a smaller portion of the voltage output by the power supply in the first, closed, state thereof and a larger portion of the voltage output by the power supply in said second, opened, state thereof.

19. An improved battery charging apparatus as recited in claim 18 wherein said latching means includes inverting means for inverting voltages in the voltage storing means and for applying the inverted voltages to a gate of the gate controlled charging means, said inverting means comprising transistor means connected between the voltage storing means and the gate of the gate controlled charging means and voltage level determining means for transmitting voltages from the voltage storing means to said inverting means and therefrom to the gate controlled charging means for causing the gate controlled charging means to operate in said blocked state thereof when said voltages exceed a predetermined threshold level, whereby said thermostatically controlled switch means causes the gate controlled charging means to operate in the blocked state when said thermostatically controlled switch means is opened due to cell temperatures above said predetermined temperature.

20. An improved battery charging apparatus as recited in claim 19 wherein said voltage divider means comprises resistance means having values selected for providing a voltage to the voltage storing means above said predetermined threshold level, thereby causing the gate controlled charging means to remain in said blocked state when said thermostatically controlled switch means is in its closed state.

* * * * *